(12) United States Patent
Owoc

(10) Patent No.: US 12,302,863 B2
(45) Date of Patent: May 20, 2025

(54) QUICK ATTACH/DETACH FORM-FITTING PET POTTY HANDLE WITH RAPID-DEPLOY/DISPOSABLE WASTE RECEPTACLE/BAG AND METHOD FOR USING SAME

(71) Applicant: Gregory J Owoc, Greenville, SC (US)

(72) Inventor: Gregory J Owoc, Greenville, SC (US)

(73) Assignee: Gregory John Owoc, Greenville, SC (US)

( * ) Notice: Subject to any disclaimer, the term of this patent is extended or adjusted under 35 U.S.C. 154(b) by 81 days.

(21) Appl. No.: 18/384,331

(22) Filed: Oct. 26, 2023

(65) Prior Publication Data

US 2025/0134070 A1 May 1, 2025

(51) Int. Cl.
*A01K 23/00* (2006.01)
*A01K 27/00* (2006.01)

(52) U.S. Cl.
CPC ............ *A01K 23/00* (2013.01); *A01K 27/002* (2013.01)

(58) Field of Classification Search
CPC ...... A01K 27/00; A01K 23/00; A01K 1/0263; A01K 1/0236
See application file for complete search history.

(56) References Cited

U.S. PATENT DOCUMENTS

| 718,915 | A | 8/1908 | Cooper |
| 3,656,459 | A | 4/1972 | Missud |

(Continued)

FOREIGN PATENT DOCUMENTS

| WO | WO 00/65906 | 11/2000 |
| WO | WO 2006/064506 A2 | 6/2006 |
| WO | WO 2021/150197 A1 | 7/2021 |

OTHER PUBLICATIONS

Title: "Picking Up After Your Dog: Why It's Important" (Published by Jean Marie Bauhaus, Mar. 3, 2021) www.hillspet.com Internet Publisher, USA.

(Continued)

*Primary Examiner* — Yvonne R Abbott-Lewis

(57) ABSTRACT

Problem: Present unsanitary, cumbersome, insufficient and unsustainable methods, systems and apparatuses, including pervasive hand pick-up of fecal matter for present management of quadruped pet waste, particularly dogs.

Solution: Disclosed is a novel, hygienic-sustainable focused, quick-deployable, potty-handle apparatus/system/method that is of a soft-gripping, gentle, form-fitting, preferably silicone or TPM or flexible wire (or combination of the foregoing) structure that can rapidly flex-attach-detach to the dog as a standalone handle-potty, or additionally, optionally flex-tether to a collar, harness, body mesh portion or leash or other tether or support upon the pet's body, employing a myriad selection of clasps, buckles and snaps connectors that are quick adjusting and releasing. Other unique optional features include full length and width adjustability, non-chaffing apparatus contact to the animal, lightweight and polymer-based spring-tensiled, or "bend-to-form-wire or strip," enabling easy on/off waste bag (preferably of compostable cornstarch material) support portion, with or without support fingers for rapid, easy hygienic waste handling and removal.

20 Claims, 12 Drawing Sheets

(56) References Cited

U.S. PATENT DOCUMENTS

| | | | |
|---|---|---|---|
| 4,502,417 A * | 3/1985 | Jenkins | A01K 23/00 |
| | | | 119/868 |
| 5,146,874 A | 9/1992 | Vidal | |
| 5,819,691 A * | 10/1998 | Lavi | A01K 23/00 |
| | | | 119/868 |
| 5,937,795 A | 8/1999 | Raphael | |
| 6,394,041 B1 | 5/2002 | Katz | |
| 7,861,677 B2 | 1/2011 | Habig | |
| 9,332,732 B2 | 5/2016 | Stoccardo | |
| 10,757,918 B2 | 9/2020 | Stoccardo | |
| 2012/0186537 A1* | 7/2012 | Curtis | A01K 27/002 |
| | | | 119/725 |
| 2013/0239906 A1* | 9/2013 | Webb | A01K 1/0263 |
| | | | 119/725 |
| 2015/0189859 A1* | 7/2015 | John | A01K 23/00 |
| | | | 119/868 |
| 2016/0007571 A1* | 1/2016 | Hoffman | A01K 1/0263 |
| | | | 119/725 |
| 2019/0116761 A1 | 4/2019 | Walter | |

OTHER PUBLICATIONS

Title:"Make Picking Up Dog Poop More Bearable" .By Laura Mueller, published on Dec. 14, 2020 www.thesprucepets Internet Publisher, USA.

\* cited by examiner

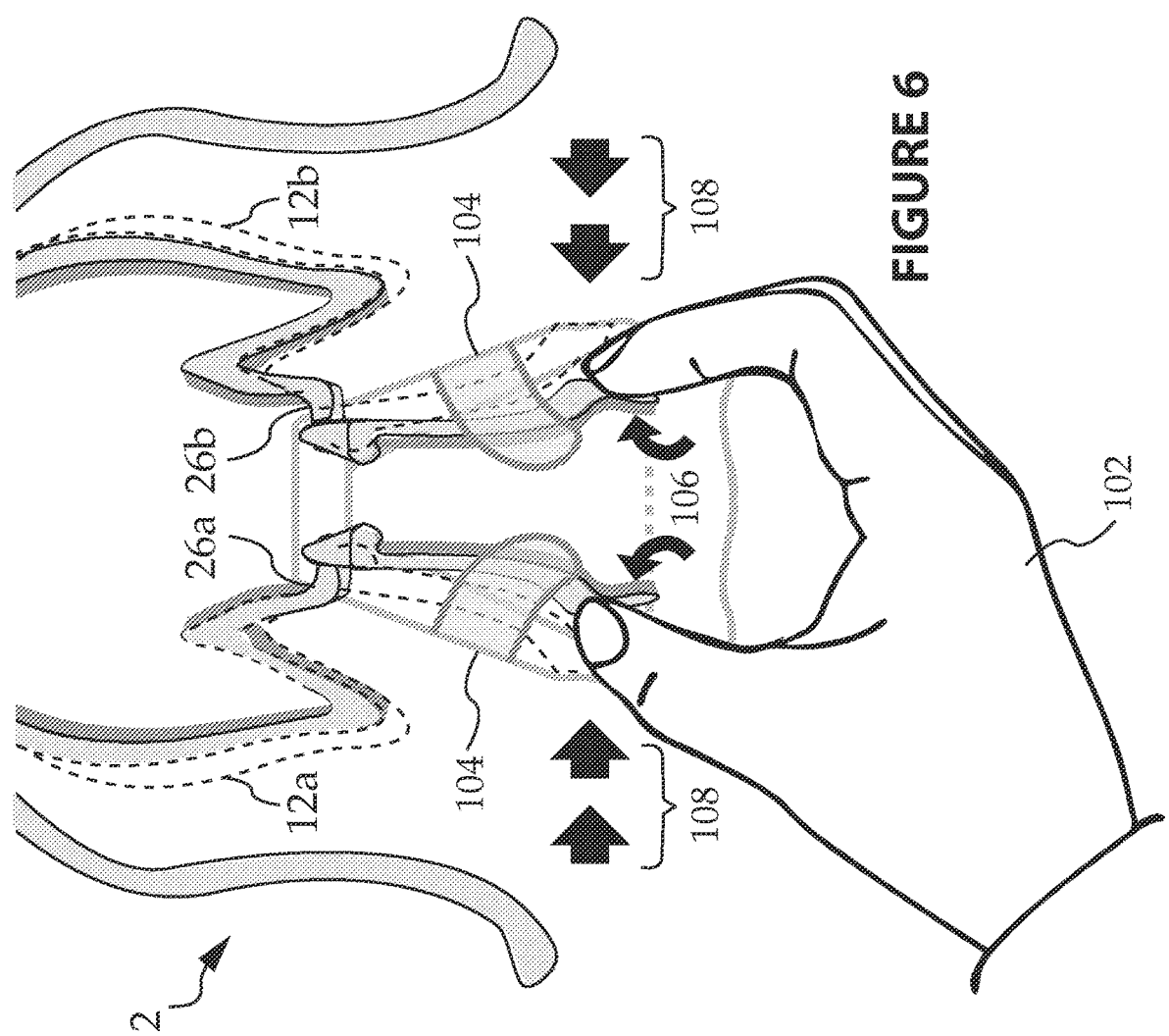

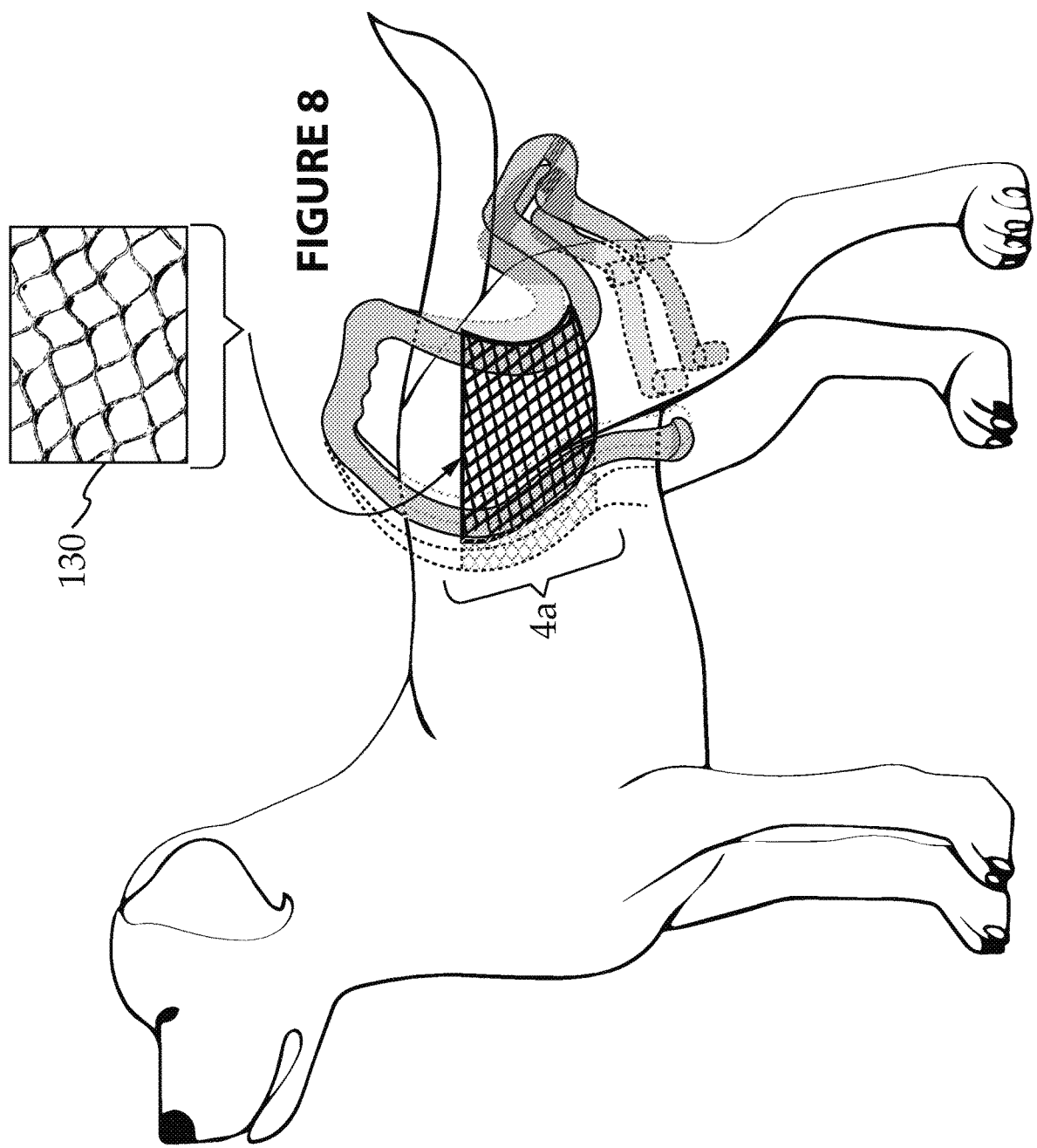

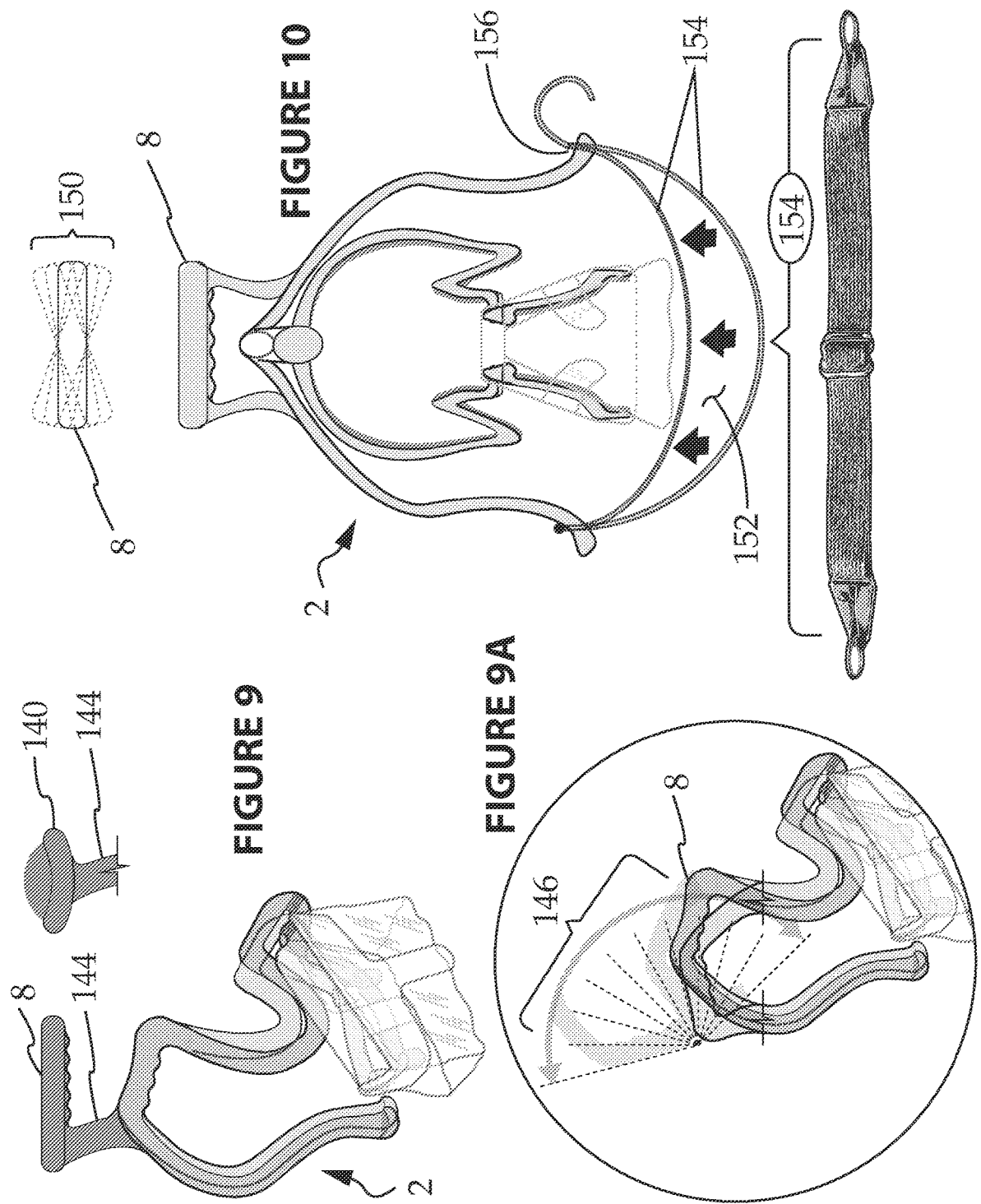

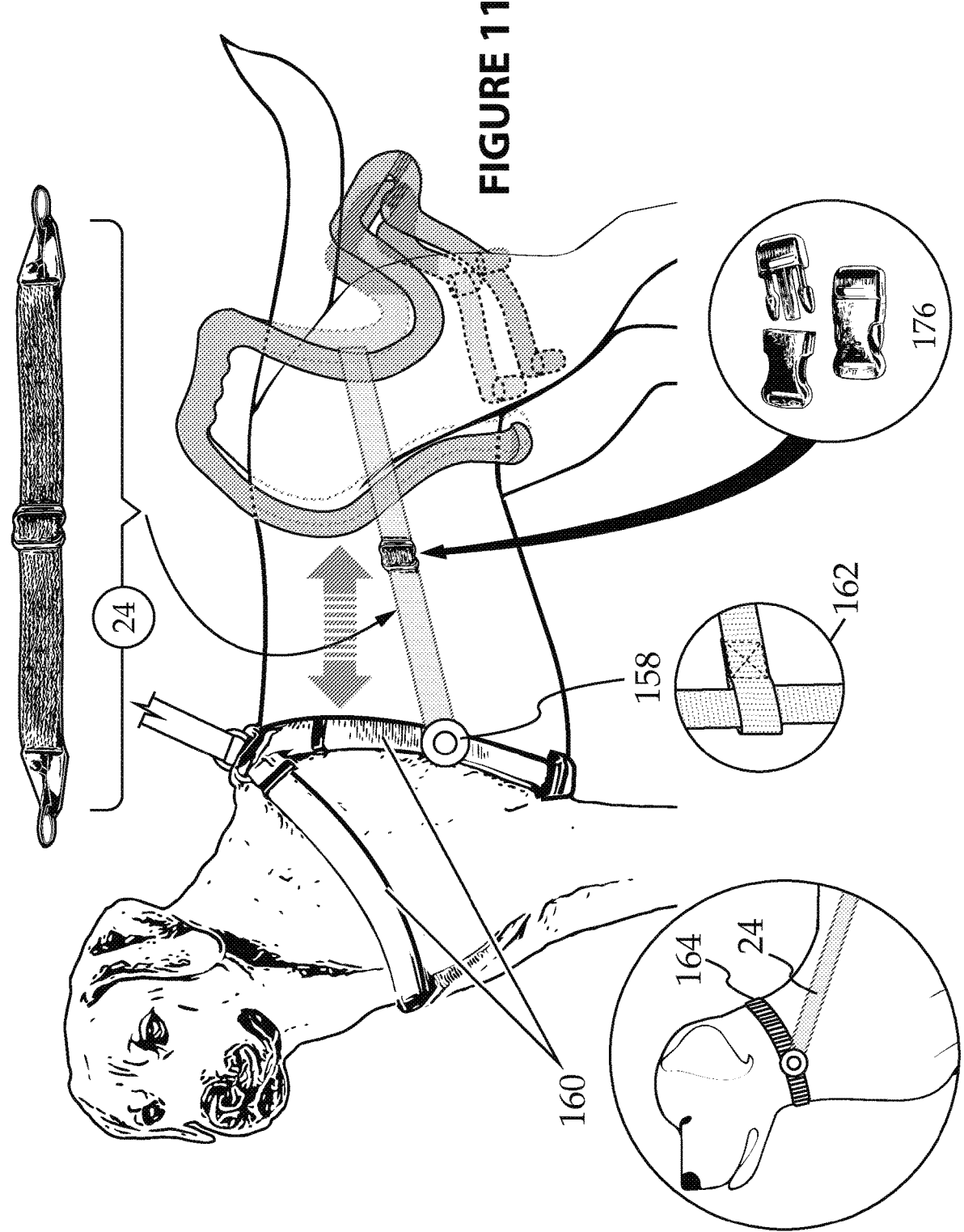

QUICK ATTACH/DETACH FORM-FITTING PET POTTY HANDLE WITH RAPID-DEPLOY/DISPOSABLE WASTE RECEPTACLE/BAG AND METHOD FOR USING SAME

BACKGROUND

Field of the Invention

The invention relates to the field of pet (particularly dogs and other quadrupeds) fecal waste management devices.

Some the following information is excerpted, adapted and quoted from: *"Picking Up After Your Dog: Why It's Important"* (Published by Jean Marie Bauhaus, Mar. 3, 2021)

The task of picking up one's dog waste is highly unpleasant, however it is an absolute necessity in modern cities and neighborhoods, not only being harmful to the environment, but it is required by most HOA's and is even illegal in many communities across the globe.

Moreover, dog fecal matter is not fertilizer, being highly acidic and it can kill grass and plant life. Moreover, it contains bacteria that could contaminate garden vegetables. It is clearly an Environmental Pollutant, " . . . the Environmental Protection Agency describes dog waste as containing two types of pollutants: nutrients and pathogens. Dog waste that gets washed into waterways may carry pathogens that affect living things in the water and can make people sick that are in contact. Also, nutrients released from dog poop can stimulate the growth of algae and other plant life, making the water unsuitable for recreational uses.

" . . . and it carries diseases, even if your dog doesn't show any symptoms of illness, their waste could still carry bacteria and parasites that are harmful to other pets and humans. And you don't need to come into direct contact with dog poop in order to contract an illness from it . . . diseases in poop can be transmitted by flies or other pets that come into contact with it . . . " Roundworms, *Salmonella, E. coli, Giardia, Leptospira*, Parvo virus, Coliform bacteria are all resulting possible threats to human health.

Finally, dog fecal matter can overwhelm the ecosystem as well as smelling terrible and thus it is just common decency and respect to take care of proper handling disposal of dog and other pet waste.

In essence, it seems clear that pet lovers have acquiesced to the arguably untenable, present primary solution of directly, by hand, handling the waste as a generally accepted, viable solution in the industry. The average pet owner considers this a negative sensory experience at the least. The continuance of management of waste that is first deposited by the pet on the ground and then directly handled by the pet owner is strong argument that there is still no viable, comprehensive, convenient and low cost "pet friendly" solution to what is obviously and could rightly be termed a "conundrum" to not being able to avoid such unpleasant activity, despite several apparatuses that have been devised to remedy this problem.

That is, if dog owners are still picking up fecal matter "by the hand" (in light of all the available options discussed above and other previously patented solution attempts discussed below), then there clearly has been no obviously conclusive industry apparatus or system or method solution yet presented to them to avoid such an—"arguably, crying need" perceived necessity. Owners, en masse, are willingly submitting to this rudimentary "unsatisfactory" solution, simply because of their tender care for and affection they have to their pet, that overrules their reticence to have direct or near direct contact with the waste—since otherwise, if there were a viable option—which the applicant believes is disclosed herein, they would readily choose such a simple and much more sensible and pleasant, easy-to-use, hygienic, low cost and sustainable, comprehensive solution.

Before discussing a few patented apparatuses that attempt to help in picking up and disposing, or management of pet waste (however such apparatuses fall short of the simple and comprehensive innovation disclosed in the subject invention herein), these following six main matters include and well-summarize the available inadequate technology associated with dog waste management, excerpted and adapted from the following second article, titled:

"6 Ways to Make Picking Up Dog Poop More Bearable" https://www.thesprucepets.com/make-picking-up-dog-poop-more-bearable-5084483 By LAURA MUELLER, published on Dec. 14, 2020 [Bracketed text is the applicant's]

. . . 1. Keep a Waste Bag Container on Your Leash . . . the bags themselves, look for biodegradable varieties made from corn, which are produced using tougher standards than ones made from petroleum . . . [Note: this means one uses the bags or plastic gloves to pick up—by hand—'fresh dog fecal waste'—this is highly unpleasant and unhygienic and is an apparatus (as a bag or glove, for eg.) and the present invention and methods drastically improve]

2. Use a Pooper Scooper . . . [cumbersome, heavy, inconvenient, expensive and the scoop/blades must be washed, wiped clean and stored after every day use, as well as needing mechanically maintained, contributing to all of the dangers above].

3. Do a Daily Pick-Up . . . [for the relative small proportion of dogs that have sufficient 'free range' yard space to allow the fecal matter to dry and then be more easily picked up by hand or scoop/shovel/etc., this still is no solution. The fact is that most dogs are walked daily, even multiple times where the waste must be "handled and taken away", as mentioned. To note, the present invention does focus however on leashed dogs being walked in a community environment on a path or road that must be kept reasonably kept and clean.

4. Flush it . . . [flushing down a toilet, for eg., is a disposal procedure and not directly associated with the core invention herein, which is concerned most specifically with the natural, simplified process of 'never allowing the waste to touch the ground from the outset.']

5. Freeze it . . . [see, likewise, comment of #4].

6. Outsource the Job . . . [this is no solution to the issue at hand, as it simply places the above responsibility upon another, typically for hire, who themselves would face the same exact unresolved "status quo" to issues to navigate the matter that has no real viable solution]."

In summary, then, the present invention seeks to eliminate the highly unpleasant necessity of taking a "bag" (or glove) in hand and grasping the dog waste, particularly freshly deposited, and as well, eliminates the need of a fecal waste scooper, or pose a need to outsource the task, since the invention never allows the animal waste from touching the ground in the first place, being a novel "on board" Gripping-Handle Potty, aka., with intended tradename: "Potty Grip™"

Patented apparatuses both in the US and International attempts to effectively and comprehensively solve the above-described conundrum with a highly marketable and useful, low-cost device have been unsuccessful to this point.

As far back as 1903 receptables or fecal catch bags, as for horses, have been patented, as in U.S. Pat. No. 718,915 which is simply a strap harness with a satchel or sac/bag attached to the back end of a horse, and emptied and reattached upon uses by the animal. Nearly all of the succeeding patents follow this bag or sack or receptacle variation with little true variation that includes other receptacles that are harnessed to the animal in various configurations.

These are discussed in the following, such as in WIPO/PCT Patent WO 2021/150197 A1 is a representative apparatus that comprises elongate straps that are connected by a circular ring or shape that is itself supported by the upper thigh that hold a receptacle that is typically a bag that hangs or is placed tightly at the back of the animal, typically underneath the tail and aligns to the groin area of the quadruped. Several other patents are highly similar in structure, one such being U.S. Pat. No. 9,332,732 B2. Shortcomings mainly include the cumbersome nature of the straps and the time it would take to "dress" the dog with these straps (maintaining their comfort on the dog and keeping them from impeding the dog's free leg movement), as well as how to maintain the hanging "catch" bag in a fixed position where waste exits the dog, underneath the tail, entering directly into the receptacle and having to align exiting waste with the bag's relatively small opening thereat.

Moreover, these straps nearly all affix their aka., bands, straps, strips, lines, strings or tethers underneath the animal and chafe the most tender part of the animals' undersides—something that the present invention has totally eliminated, though that option is still usable in the subject invention. Another patent, U.S. Pat. No. 5,146,874 might be considered a forerunner of the above structures—yet still retaining the same limitations, also includes an appendaged container affixed to the straps that purports to catch the quadruped's feces, as well as urine. Again, another quite similar apparatus as the '874 patent is found in U.S. Pat. No. 6,394,041 B1 and in Application Pub. No.: 2019/0116761 A1.

Still another very similar structural attempt to those above is disclosed in U.S. Pat. No. 10,757,918, which instead of straps uses cords or string and simply has a more solid container, rather than a bag, as in the above patents. Still, being substantially quite similar, however, and for the same reasons, it is ineffective as a solution.

It is remarkable and well worth noting that the following patents and other IP listed continue to follow quite a familiar structural pattern, respectfully said, but also ineffective structural solution, as above, that evidently has never been able to reach the market as a viable solution to the above-described conundrum.

U.S. Pat. No. 7,861,677 B2 (the disclosure more so akin to a diaper that has orifices allowing the tail and legs to pass through said diaper (having nearly the same bag appendaged to the dog's posterior body portion). Three patents, WO 00/65906, U.S. Pat. Nos. 5,937,795 and 3,656,459 all three utilize a tightly placed bag at the pet's posterior orifice and use either a strap or, as in the case of the '459 Patent affixed "arms" (attached to a "flexible tube", acting as a "plug" place close to the animal's posterior end underneath its tail to catch fecal waste) to steady or hold in place the apparatus upon the pet's body. U.S. Pat. No. 5,819,691 uses the same basic structure as these former three but uses, in addition to the plug-type tube. It may be argued that these catch tubes, and balloon-type receptacle sleeves and tightly affixed bags will not stay in alignment and thus allow fecal matter to undoubtedly spill or ooze outside of intended confines as the animal and its backside moves freely, even within the affixed harness and holding apparatuses.

Finally, PCT WO 2006/064506 A2 disclose an articulated swiveling holder for a feces bag attached to a body-clamp member. The difficulty with this design is that the bag hangs down low, potentially dragging onto the ground except for quite long-legged pets when the animal squats. As well, the waste bag and linkage arms supporting it chaff the back of the animal's legs when the pet is upright, walking. Moreover, clamp can easily slip off the animal's body and is arguably cumbersome for a pet owner to affix onto the animal.

Lastly, a metal clamping apparatus with an insertable, rigid cup or receptacle, the cup itself that is supporting a disposable waste bag thereinto is disclosed in U.S. Pat. No. 4,502,417. The structure, though an improvement to the prior art discussed, still lacks the ability to accurately align with the animal's waste exit and unless the animal was in a perfect position in a squat, with perfect alignment to the receptacle, the apparatus would not be effective and undoubtedly allow spillage. A rigid "pot" that, even if increased in size would become weighty and an untenable receptacle burdening the pet—arguably would not be able to be naturally aligned due to inflexibly. Its position adaptable at the animals "orifice" supported by the hard wire frame and would likely not catch the animal waste accurately, since it remains in a fixed angle and plain and does not flexibly adapt to the animals posture. Moreover, the nature of the structure lends itself to to little or no flexibility of comfort for the animal, though the girth of the retention holding arms are annularly adjustable. As well, there is little or no "longitudinal (axial length to the animal's body) adjustment" and the adaptability to different size of—or a range size—animals is highly limited.

SUMMARY OF THE INVENTION

Objectives of the Invention

It is disclosed in this Summary first among others objects of the invention therefore to provide a novel and effective solution to, in a pet waste management apparatus and system (method), the shortcomings of the prior art that is a significantly improved gripping device. Called a potty handle, or potty grip, or pet waste management apparatus, the invention is built around, arguably, the most important element neglected by the former structures—that of an onboard handle potty apparatus and system that includes the waste receptacle or waste receiving bag (as well as including and comprising all the other novel, optional features) that facilitates and enables a pet owner to operate the apparatus effectively and easily.

It is also an objective, then, to provide a highly simplified "unitized" preferably single-mold integral handle (though multiple other apparatus parts components may be combined or joined or linked or tethered to attach to a permanent or detachable handle as to the other parts of the said apparatus or form through snap-fitting, sewing, clasping, gluing or welding together, in a myriad of well-known manufacturing methods and assembly configurations—an apparatus to fulfill and carry out the present invention). This handle may instead be a flexible strap-like, even woven material itself, as various tethers described herein.

The basic novel embodiment comprising a handle that has at least one molded or formed/shaped, preferably with spring-tensiled material, as an arm or appendage, but preferably two spring-tensiled arms/appendages that conveniently, firmly but comfortably snug-fit the animal (upon its preferably hinder parts—and said at least two arms defining a form-fitted shape of the animal's body girth and hinder parts) and further comprises, underneath and toward the back end (posterior) of the animal—when affixed to the animal's body—further comprises molded fingers (or alternatively, a receptacle) that may form a carriage whereby a pet owner may rapidly deploy and firmly attach thereto or thereupon or thereinto a fecal holding bag (that may also retain urine, as well), preferably a compostable or biodegradable bag (as one made of at least one corn starch, etc.).

Moreover, in one preferred embodiment, the smaller "receptacle-support" arms, aka, (preferably spring-tensiled) support fingers, aka, support appendages that form the said carriage, hold or support the waste bag or container may be molded or formed in manufacturing with a polymer and molded to an "outward" angle that may be "spring-tensiled" so that when squeezed they allow simple and rapid affixing thereon of a waste bag—whereupon at release of the support fingers, the bag (or receptacle) is firmly attached—and whereby the squeezing of said (spring tensiled) arms to remove the waste bag allows for easy and rapid disposal of waste with the minimal time handling the waste, and said bags which could also include die-cut 'tie-ears' that act as a tie-up tether to secure waste in the bag, which are commonly known in the waste industry, particularly sustainable waste management. Moreover, the support fingers would preferably have at least one receiving slot or sets of slots, preferably molded thereinto that would firmly receive and securely hold the said waste bag, aka., fecal waste bag.

As well, it is an object to provide alternate carriages as optional waste receiving vessels, aka, receptacles in lieu of the bag, such a snap-fit or soft, fully enclosed (with optional lid) receptable that may also fit into or be likewise supported by OR in lieu of the said various optionally or variably shaped support fingers, or annular or close loop support structure.

A further objective is to provide a Handle Potty Grip with form fitting (that also may form-fit, aka contour fit the body of the animal also, as explained above for the lower spring-tensiled fingers in a "polymer-spring-tensile" material, preferably Polypropylene or Silicone base material), so that a soft and smooth, quick attach and quick detach from the animal's body can be achieved by the pet owner when deploying the device during each pet walk session.

It is further intended that the same contour arms, aka., form fitted arms, aka, gripping appendages, aka, adjustable arms, aka, spring tensile arms, may an optional bendable-form, as "Garden Wire"—(typically two millimeter range gauge and steel or stainless steel, used to train plants or small tress)—and may have various degrees of spring-tensiledness, body clinging/holding wire inside the soft polymer mentioned—and, the optional wire arms themselves be optionally made of this bendable, form shaping wire itself (perhaps additionally coated with a polymer film—as by wet dipping a plastic/polymer coating) or a sleeve heat shrink sleeve shrunk or slid thereon, OR, even further an over molded arm, as several of many options. As well, noting this said wire would be preferably though not exclusively made of a metal.

It is an additional object of the present invention to provide many optional tether and other stretch materials, as meshes, wraps or breathable soft cloth materials that can rapidly be wrapped nearer the animal's frontal or chest underneath—only if needed—to optionally tether to the form-fitting said handle arms for, perhaps, a more rambunctious animal that might tend to throw off or slip through the form fitting arms, alone.

Quick release adjusting type buckles and snap-connectors, as well as Velcro and many other snap-connect and insert locking type common in backpacks and hiking gear or clothing belt buckles and connectors and other devices well known in tether and belt art would be desirable to employ for this tether connecting purpose.

Moreover, novel "slip-fit" sleeves or "swaths of stretch or non-stretch material" may be included on the said stretch material and are devised that the said form fitting or form adjusting handle arms could easily slip into or upon and out of or on and off of these sleeves for simple and quick implementation and use of the invention.

Finally, as the above objectives help solve the many shortcomings of the prior art, it is an objective to refine the said Potty Grip™ Handle invention further by providing an optional hingeable handle, with or without a spring. Also, the handle portion of said Potty Grip invention that fits a user's hand may comprise many, open or fully looped, aka, closed grip, as well as having various optional knob type handle portions fixed or adjustable handle angle modifications. Moreover, the invention can seamlessly and functionally adapt and attach and combine with minimal tethering/strapping to the pet collars presently in use to fit and well adapt aesthetically, as well as functionally, with present collar and leash systems in widespread use.

Hence, the Subject Invention May be Further Summarized as Follows

Unsanitary, cumbersome, insufficient, and unsustainable methods, systems, and apparatuses for present management of quadruped or animal pet waste, particularly dogs, is a serious problem that has yet to have a clear and definitive solution. By solving these shortcomings of the former art above, the invention, by incorporating novel art for attaining the Objectives above, as discussed in their detailed elements and functional componentry and structure, the said Potty Grip™, subject invention overcomes all these deficiencies of the former art.

The novel, hygienic-sustainable-focused, quick-deployable, handle-potty apparatus/system/method is intended to be of a soft-gripping, gentle, form-fitting, preferably silicone or TPM material structure that can rapidly, gently flex-attach-detach to the pet. For example, the preferably integral handle-potty structure, comprises soft flex "slide-off, slide-on" form fitting arms that may comprise internal spring-fitting and/or bendable/flexible wire, and additionally, optionally various flex-tether components that may assist in quickly, gently attaching and detaching the said Potty Grip to, for example, a dog collar, harness or leash, while supported on the pet.

The major, quintessential problem, among the significant other shortcomings discussed above of the prior art, however, is: None of the devices disclose the device of the subject invention—itself—let alone, comprise a fundamental handle—The handle structure conceived and invented herein is to simply, easily manage and maneuver the waste catching apparatus integral or attached thereto. Innate to this major disadvantage in the former structures is the strap/tether type structures that are flimsy by nature that unsuccessfully attempt to hold various receptacle, soft or rigid, comfortably and accurately in place—primarily, absent and missing the many other novel features of the subject invention, because they are not built around the novel handle structure "comprising a lightweight, flexible-rigidity" uniquely integrating the said straps and tethers, etc. of the present invention, even including all or part of the handle to be of a tether woven or simply a flexible (even made of woven material) handle, itself though a rigid or semi-rigid handle is preferred.

Moreover, even the few rigid structures above have no way to easily place the (what are arguably ineffective apparatuses to begin with) apparatus onto and off the pet in a rapid-deploy, soft-tactile and automatic "form-fitting" way—Since the subject invention is a minimalist, lightweight and gentle handle grip potty innovation that stays put, comfortably affixed, flexibly, it easily, softly and amply adapts to the pet's full range of motion—there is no complicated structure in the subject invention causing physical chafing or encumbrances atop or underneath at the pet's tender areas. The apparatus and method using the same is a comfortable and kind, humane manner incorporated into a structure and method of use that solves the conundrum of how to properly, sustainably manage pet waste, quickly and efficiently, particularly dog waste, for what has been for a thousand plus years an unpleasant experience for quadruped pet owners.

Thus, the present invention, in addition to the advantages above, incorporates all these features as an integral handle for easy grasping and setting, aka., placing or affixing upon the animal. The pet owner and animal no longer suffer encumbrances to place and activate the subject invention's minimalist and preferably unitized, cost-effective "single mold" design. Time waste, frustration, or pain as to either preparing the animal for its 'walk" as well as rapid detaching of the device and quick, hygienic afterward disposal and easy, sensible and sustainable waste management apparatus and system/method is accomplished by the subject invention.

Other unique optional features include full length and width adjustability of the handle and non-irritating apparatus contact to the tender underside of animal. Lightweight in structure and causing no encumbrance to the comfort and easy movement of the pet, the invention comprises a waste receptacle support portion, enabling fast, easy hygienic waste handling and removal through the said spring-tensiled fingers, aka., small receptacle support arms, for enabling easy on/off handling of various, optional waste receptacles (preferably a bag made of biodegradable cornstarch material).

It is to be noted that in the Summary above, Brief Description and Detailed Description the applicant describes many and varied inventive steps conceived and applied sound structures and methods enabling one skilled in the art to make and carry out the invention.

All steps to achieve such are inventive in unique arrangement, combination and novel introduction of new components, sequentially structured elements co-extensively integrated into the multiple-embodiment, single specie invention, including parts that are not only interchangeable (with slight modifications), but modifiable and adaptable to and with all the invention's components disclosed.

As well, disclosed is a significantly thin, but sturdy, light weight, robust and compact device made with a lean manufacturing footprint with minimalist, sustainable, low-cost manufacturing, ribbing, arms, assembly and material. Modified versions of the invention may look even considerably different from the apparatus as drawn and illustrated and method of use disclosed herein may be contemplated by persons skilled in the art, now that the applicant has taught the novel structure, without departing from the scope and claims of the invention.

Therefore, it should be obvious to one skilled in the present art to see many possible general modifications and elements that may be substituted for those employed to achieve the purposes of the present invention while not departing from the spirit or scope of the present invention. Further characteristics of the invention may be understood by the following description and drawings, preferred embodiments of which are by way of example and non-limiting to the spirit and scope of the invention.

Other innovative features, advantages and novelty of the subject invention will be seen through the following Brief Description and Detailed Description.

BRIEF DESCRIPTION OF THE DRAWINGS

FIG. 2A is a slight perspective front isolated view depicting the handle potty grip invention as being manufactured of alternate, form fitting wire-type, memory holding material.

FIG. 3A is a flat sectional front view of the handle potty grip invention as rapid attachably and detachably placed upon a pet and showing optional adjustable strap material with adjustable buckle, wrapping the girth of the animal, but affixed away from the pet's tender underside and a tether option connectable to said handle potty grip.

FIG. 3B is a flat sectional front view of the handle potty grip invention as rapid attachably and detachably placed upon a pet and showing optional adjustable band having open mesh material wrapping the girth of the animal but affixed away from the pet's tender underside and a tether option connectable to said handle potty grip.

FIG. 4A is a side perspective view of the handle potty grip invention as conveniently gripped by a pet owner and as viewed on a upon a pet dog showing the side features of the said Potty Grip™ apparatus.

FIG. 6 is a back, aka., hinder part perspective view of the handle potty grip invention viewed as a standalone device, showing the back features of the said Potty Grip™ apparatus and pet owner flexing the spring tensiled receptacle holding fingers.

FIG. 8 is a side perspective view of the handle potty grip invention as conveniently gripped by a pet owner and as viewed on a upon a pet dog showing the optional elastic mesh features of the said Potty Grip™ apparatus.

FIG. 9 is a side perspective view of the handle potty grip invention viewed as a standalone device, showing the side features of the said Potty Grip™ apparatus, showing optional additional handle fixed-angle configurations.

FIG. 9A is a side perspective view of the handle potty grip invention viewed as a standalone device, showing the side features of the said Potty Grip™ apparatus, showing optional additional handle configurations.

FIG. 10 is a back, aka., hinder part perspective view of the handle potty grip invention viewed as a standalone device, showing the back features of the said Potty Grip™ apparatus with an optional tether underneath to secure to said form fitting arms.

FIG. 11 is a side perspective view of the handle potty grip invention as viewed on a upon a pet dog showing the side features of the said Potty Grip™ apparatus further showing optional tethers, belts, bands as connectible to a dog collar or harness.

DETAILED DESCRIPTION OF THE PREFERRED EMBODIMENTS

Figure 1:
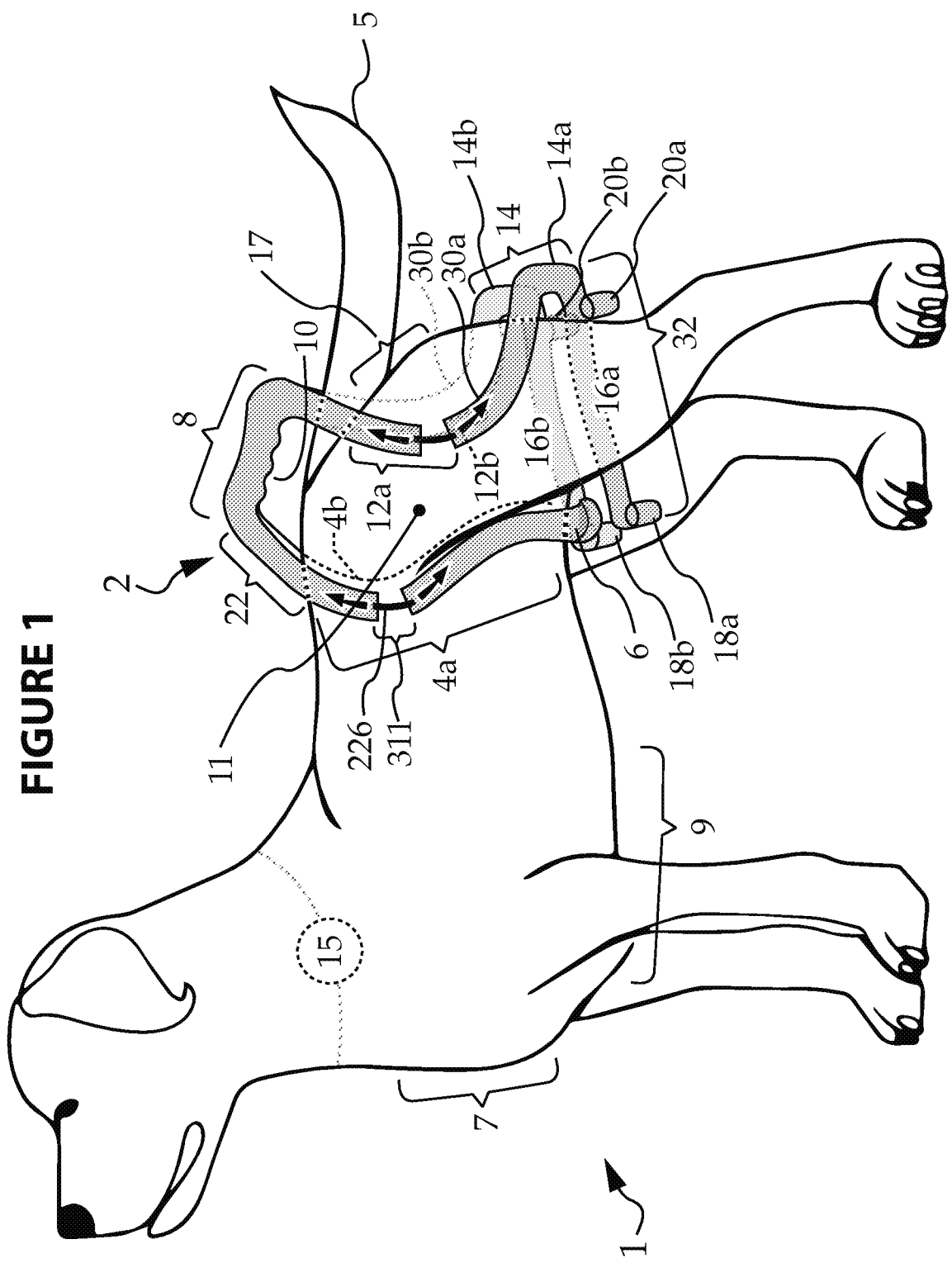
FIG. 1 is a flat front view of the handle potty grip invention, aka, pet waste management apparatus, as rapidly attachable and detachable upon a pet.

Noting FIG. 1, FIG. 2, FIG. 2A, FIG. 3, FIG. 3A, FIG. 3B, FIG. 4, FIG. 4A, FIG. 5, FIG. 5A, FIG. 6, FIG. 7, FIG. 8, FIG. 9, FIG. 9A, FIG. 10, FIG. 11, and FIG. 12 the basic novel invention 2 embodiment disclosed therein (and hereby incorporating all the description and wording of structure, parts and function in the Summary and Background above), particularly in FIG. 1, called Potty Grip™ 2, aka potty handle apparatus 2, aka, waste management apparatus 2, shown upon a quadruped pet, 1, aka, pet 1, aka, animal 1, (which has tail 5, neck collar area 15, front chest 7 and lower chest 9, fecal exit area 17, aka exit area 17), whereupon is attached or comprising (or integrally molded together with, for example) a handle grip 8 (having handle grip clearance portion 10) that has preferably, integrally molded (ie., of a single mold structure—though it can be made of a flexible, even woven or cloth-like material—and as well the there is at least some of the said handle grip clearance portion 10, aka as hand space 10 for insert hand and lifting said handle 8), preferably spring-tensiled arms 4 (shown as 4a, 4b, respectively), aka grip arms (and aka front grip arms) 4a, 4b, (aka, spring-tensiled arms), aka, at least one pet body gripping appendage 4a, 4b extending therefrom (but preferably comprising two gripping appendages 4a, 4b, respectively—ie., one said appendage 4a contouring said body on one said pet 1 body side and the other said appendage 4b, respectively (having [soft and/or rounded] lead-in tips 6, aka lead tips 6), as well, noting rear grip arms 12a, 12b (noting also FIG. 6 as rear end view illustration), respectively, aka, rear grip portion 12a, 12b, aka, at least one back-end portion 12a, 12b, respectively, that also form fit (as well, noting their form-fitting curvatures, 30a, 30b, aka, curves, 30a, 30b, respectively) further to the posterior, or said back end portion 12a, 12b of said potty grip 2.

Note: Said at least one back-end portion 12a, 12b can comprise two back end portions and, as well, either form fit while touching the said pet 1 body, or not touch—or even form-fit—the said pet's 1 said back end pet body portion 11, and as well may also have a similar pet body gripping shape 225 of said arm 4, as mentioned further below (Note: Said arm 4 may instead comprise a "full cap like" back end design/structure, or wider pet body covering structure instead, whereby a cap (or helmet like structure can even optionally have perforations of polymer mesh thin wall construction and even be a mesh-type securing structure 130 (see FIG. 8) aka, stretch mesh material 130, that actually touches and form fits said pet 1.

However, it is preferred for said back-end portions 12a, 12b, be supported in a contoured, gripping position, touching said pet's 1 said back end 11 and supported upon or contoured to pet as the said pet's 1 back end 11. and further comprising at least one support arm 14 extending therefrom; said at least one support arm 14, (that may comprise two support arms 14a, 14n, preferably), further extending preferably below the said pet 1 body and supporting a fecal receiving container 118 thereon.

All of the above structure and materials may be comprised of a lightweight material that can be bent into shape, pre-formed in manufacturing or bent by a pet owner to form fit, including also being additionally "spring-tensiled" to stay in place on the pet body posterior 11, aka, pet hinder parts 11, aka, pet body back end 11, as a bendable polymer or, optionally, in FIG. 2A, noting view box 227 (showing only one of many possible alternate versions of said potty grip 2 material, configuration and structure, such that a person skilled in the art may obviously devise now that the applicant has taught the novel subject said invention 2), and further may be constructed of a wire frame 226 (noting that this frame could be in many sections, not necessarily needing to be a continuous wire, aka 4a, 4b and that the apparatus 2 may further comprise aka sliding-adjustable frame members 4a, 4b, as herein also described as that are adjustable to fit a pet 1 body), such as can be bent into shape that it will remain spring-tensiled—yet, remain bent into a form-fitting shape, ie., "formed-to-shape" as semi-permanently in that shape by the apparatus' user—and even be widened or lengthen as the said pet 1 grows larger or heavier.

Moreover, though not necessary, said apparatus 2 may also comprise optional handle 228 attached, which handle, itself, may be over molded, snap fitted or adhesive attached or otherwise mechanically attached to said frame 226, aka wire 226, which said handle 228 could be the said wire 226, itself, could be part of the said same wire—or Note: It is obvious the said presently firmer polymer or metal strip or wire or other rigid or semi-rigid materials—instead, the handle could be made even of the said tether material, or even be simply a portion along the length of the many tethers and positions of those tethers in various places upon the said pet 1—and that has the said hand clearance portion 10 along ANY point in or along or attached thereto the said tether 24.

It should be obvious that any combination of wire, sliding metal, sliding polymer pieces, or wires within polymer could be employed to provide a highly versatile and adjustable frame of said waste management apparatus 2 that would fit—in one manufactured model—a wide variety of pet, particularly, dog body sizes.

Further, additionally noting FIG. 2A, an over mold arm 229 (preferably of soft polymer and covering all or only a part—as shown optionally covering all or a portion of said wire frame 226, aka wire 226), that further, may be of or comprise slidable-adjusting split portions 311, aka split portions 311, aka sliding-adjustable frame members 4a, 4b that are adjustable to fit a pet body.—(which said splits could be located anywhere on said Potty Grip 2 and in multiple splits thereon, as well) on said wire frame 226 in order to allow the said grip arms 4a, 4b, (or upon said rear grip arms 12a, 12b, any of which could be lengthened or shortened (to accommodate a wider or thinner, longer or shorter body of said pet 1), as well as combining with the said bendability of said arms enable a lightweight, durable, comfortable, high adaptability to different size and shape quadrupeds, particularly various widely differing dog body shapes, widths, lengths, heights, etc., enabling another objective, that is being able to have only two or three maximum market model devices adapt to nearly all size pets.

Moreover, in FIG. 1 said handle grip 8, aka handle 8, may separate or "fork" having bifurcated portion 22 conveniently, firmly, but comfortably, preferably snug-fitting to body of said pet 1 and "bifurcating" from said handle 8 through the adjustable features and structures immediately discussed above (upon, at or near, its preferably said hinder parts 11, aka pet body back end 11, aka, pet posterior 11 of said animal 1).

Said Potty Grip™ 2 further comprises a receptacle support portion 32 having at least one said support arm 14, (that may comprise two support arms 14a, 14n, preferably), and whereat at least one said two support arm 14a comprises a first support finger 16a and the other said support arm 14b comprises the second said support finger 16b respectively, of which said support arms and said fingers are shaped to unobtrusively, gently suspend beneath, with minimalist contact to the soft mid underbody 3, aka, middle-underside 3, aka, soft underside 3, of said pet (as would enable a pet owner to quickly, softly locate and position said support portion) underneath the said hinder part 11 of the said pet 1, thus allowing a pet owner easily maneuvering of said receptacle support portion 32 of said pet waste management apparatus 2 and rapidly able to be positioned underneath the said animal's 1 body, while simultaneously and rapidly placing said potty handle 2 snugly, comfortably upon the said pet.

Figure 7:
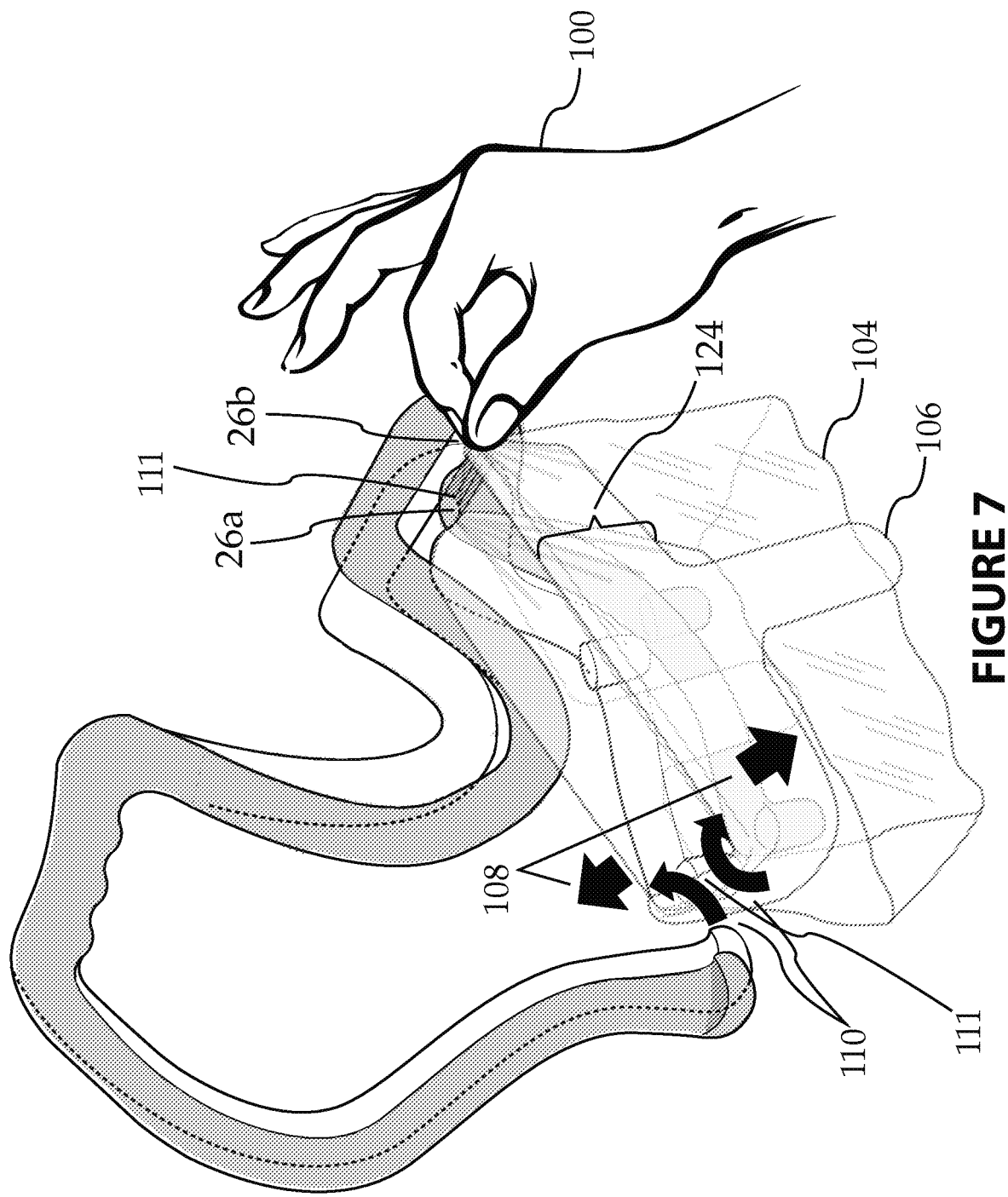
FIG. 7 is a side perspective view of the handle potty grip invention viewed as a standalone device, showing the side features of the said Potty Grip™ apparatus, viewed as a standalone device, showing the side features of the said Potty Grip™ apparatus and pet owner flexing the spring tensiled receptacle holding fingers so as to attach an attachable/detachable waste bag type receptacle on the said finger, aka., carrier finders.
Figure 7A:
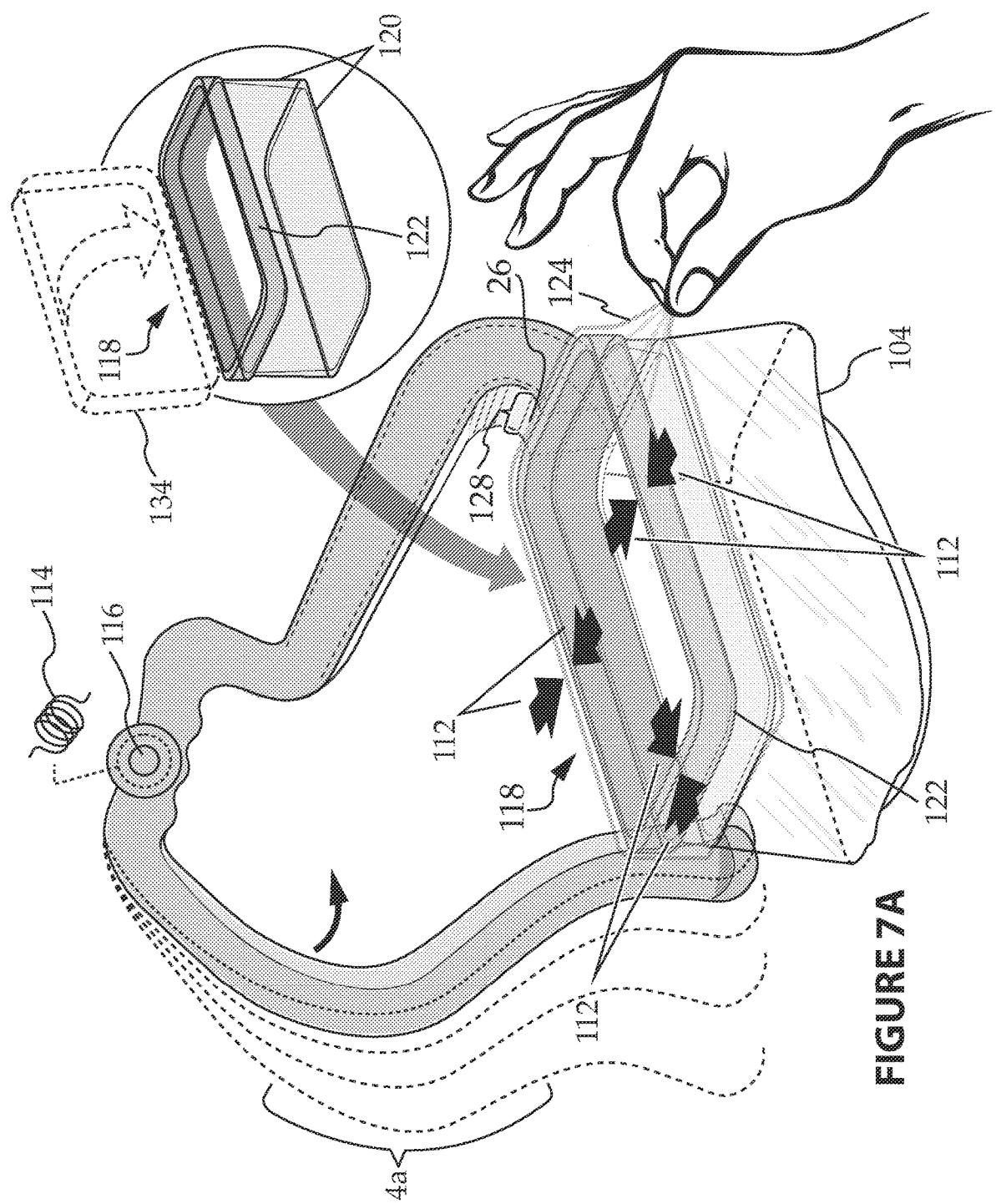
FIG. 7A is a side perspective view of the handle potty grip invention viewed as a standalone device, showing the side features of the said Potty Grip™ apparatus, viewed as a standalone device, showing the side features of the said Potty Grip™ apparatus and pet owner flexing the spring tensiled receptacle holding fingers so as to attach a waste bag type receptacle on the said finger, aka., carrier finders.

Said support portion 32 further comprises finger supports 16a and 16b, respectively, aka, support fingers 16a, 16b, aka "receptacle-support" (small) arms 16a, 16b, that may be integrally molded or affixed in a forward direction, toward the said pet chest 7 (as directionally, presently shown) or back facing to the said pet posterior 11 of the said pet. Note: Said fingers 16a, 16b may comprise front protuberances 18a, 18b, respectively and rear protuberances 20a, 20b, aka, nubs 20a, 20b, respectively, that may help support a detachable (or integrally molded-to-support (or fully molded "around" as to form an alternatively constructed single aka, "rimmed receptacle" 118 said fingers' 16 said cup-like container 118, as in a closed or partially closed, fully closed or, aka, said rimmed receptacle 118 shown in FIG. 7A, which may include a live hinge or mechanical attached or otherwise affixed, hinge lid 134 combined to full cup receptacle 120 aka., molded cup-like removable container 120 (which may be molded into said support fingers 16a, 16b). It is to be noted that said cup-like removeable container 120 can alternatively be a cup-like bag 104, aka fecal bag 104, aka., attachable/detachable waste bag 104, to be used instead of the said container 120, and is a preferable modification since it would be more easily disposed of—with the pet waste and no containers would need cleaned, thus being much more hygienic.

This said lid 134 may formed to hinge and cover and uncover, said cup-like removable container and seal fecal waste in said container while pet is on a walk or whenever said potty grip 2 is removed from said animal 1, (optionally combined with an optional cup receptacle 120) that may be formed in combination with or simply comprise said rim 122, aka., molded receptacle rim portion 122. Said hinge lid 134 may form a cover over said cup-like removable container 118.

(NOTE: It is obvious that the said fingers 16a, 16b may instead be substituted by the molded or formed [as in a wire shape form or polymer ring, eg.] said receptacle rim portion 122 as still another modification of the said fecal receiving container 118 (aka, cup-like container) 118.

Preferably, a pet owner may rapidly deploy and firmly attach thereto said fingers, 16a, 16b, or said fecal receiving container 118, aka cuplike removeable (or permanent) said container 118, aka receptacle 118, thereupon or thereinto any type of disposable, preferably a compostable or biodegradable bag, as said attachable/detachable waste bag 104 (as one made of corn starch, or fiber paper or pulp, etc.) having bag lip 124 and bag stretch area 112. Moreover, alternate support arm 128 further comprises a receptacle rim portion that instead may, as a single arm, detachably/attachably supports said fecal receiving container 118 thereon.

Moreover, the said "receptacle-support" fingers 16a, 16b, made preferably of spring-tensiled material, are one of many structural supporting options that support or suspend the said waste bag 104 or said container may be molded or formed thereupon or thereinto in manufacturing with a polymer and molded to an "outward/inward" spring position 108 of said fingers that may be "spring-tensiled" so that when squeezed they allow simple and rapid affixing thereon the said waste bag 104—whereupon at release of the support fingers, the said bag 104 (or said receptacle 118 which bag and polymer molded cup-like removeable container) is firmly attached—and whereby the squeezing of said (spring tensiled) arms to remove the said waste bag allows for easy and rapid disposal of waste with the minimal time handling the waste, and which could include 'tie-ears" 106, aka, tie tabs 104 that may be die-cut and act as a tie-up tether to secure waste in the bag for even more easy, sealed disposal, which type bags are commonly known in the waste bags industry.

Moreover, the said support fingers 16 would preferably have receiving slots 26a, 26b, respectively (further having slot corners 28a, 28b), respectively preferably molded thereinto that would firmly receive the said waste bag 104, aka., fecal waste bag 104, in a stretch-holding manner at bag lip portions 110 and 111, as said support fingers 16 said receiving slots 26a, 26b preferably molded thereinto, whereinto said bag lip portion 110, 111 of said waste bag 104 is affixed respectively.

One of many advantages of this minimalist structure is that even if the said pet moves and bends or contorts its body inordinately, the said waste bag has a free float rim end—or both ends—or at either ends that has no polymer support at all, thus being highly desirable, since it prevents chafing of the pet underside 3 in those areas, as would be the pet's tail under portion, or in a male pet, its male organ. Moreover, this is how said bag lip 124, aka, bag overlap 124 in FIG. 7 and FIG. 7A, also are on the lengthwise said fingers and also form a stretch-hold, all contributing to a very minimal amount of "hard or semi-hard polymer or metal wire material, other hard component material" that can ever chafe the said underside 3 of the said pet 1 As well, note the "hingability" the said Apparatus may effect using hinge 116 with optional hinge spring 116 which may add even more comfort and form fitting qualities to the said apparatus 2.

Moreover, the said nubs 20a, 20b further provide a fecal volume spill-over limit to shorter leg pets, particularly when in a low squat (unlike the high squat, long legged pet in FIG. 12) by preventing the said bag 104 from pressing down flat to the ground, thus keeping a "minimum reservoir chamber", since the said nubs allow the bag volume to remain at least one or two minimum inches in depth, keeping waste inside the said bag, no matter how low the said underside 3 of the pet may go.

Figure 2:
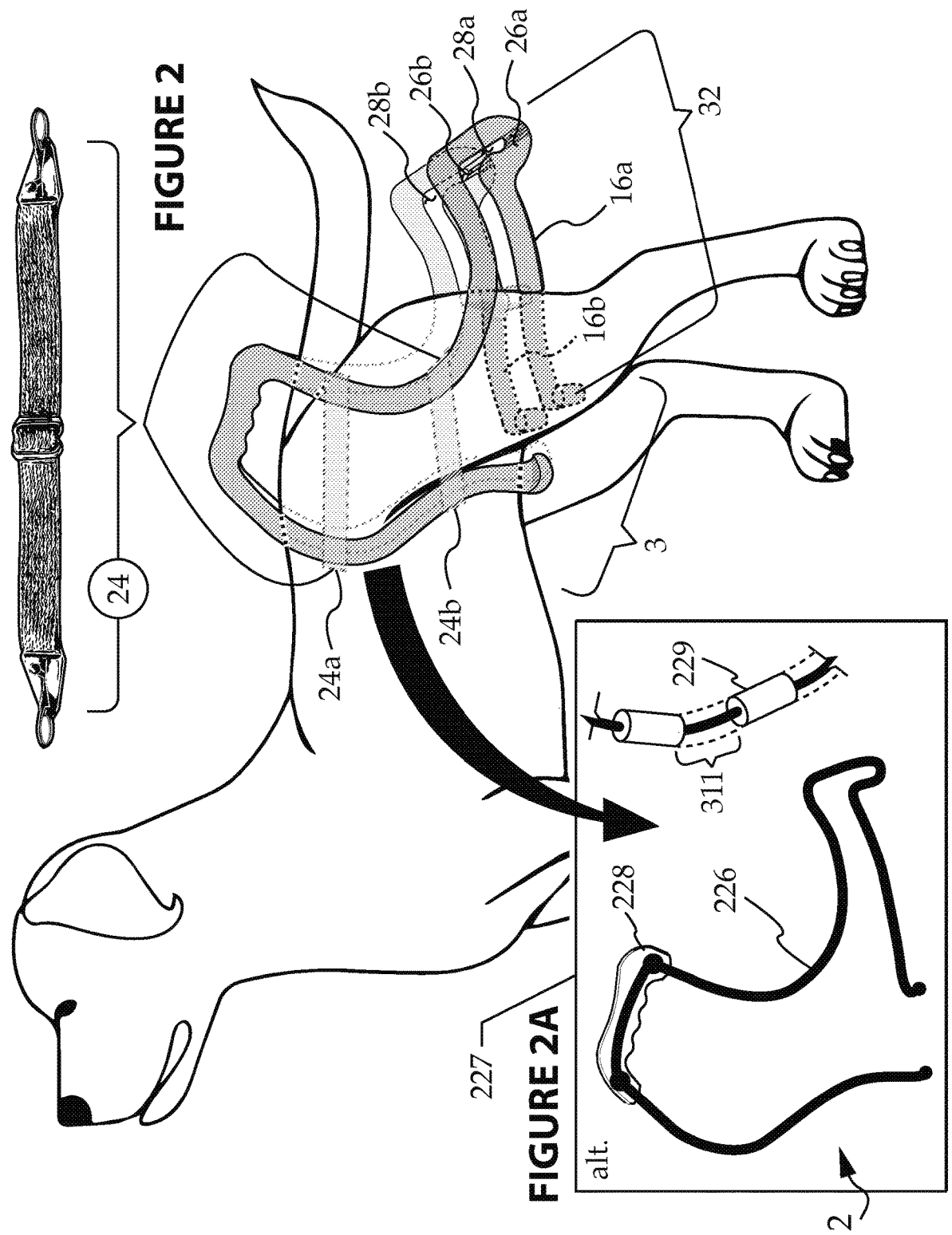
FIG. 2 is a flat front view of the handle potty grip invention as rapid attachable and detachable placed upon a pet and showing optional adjustable strap material.
Figure 3:
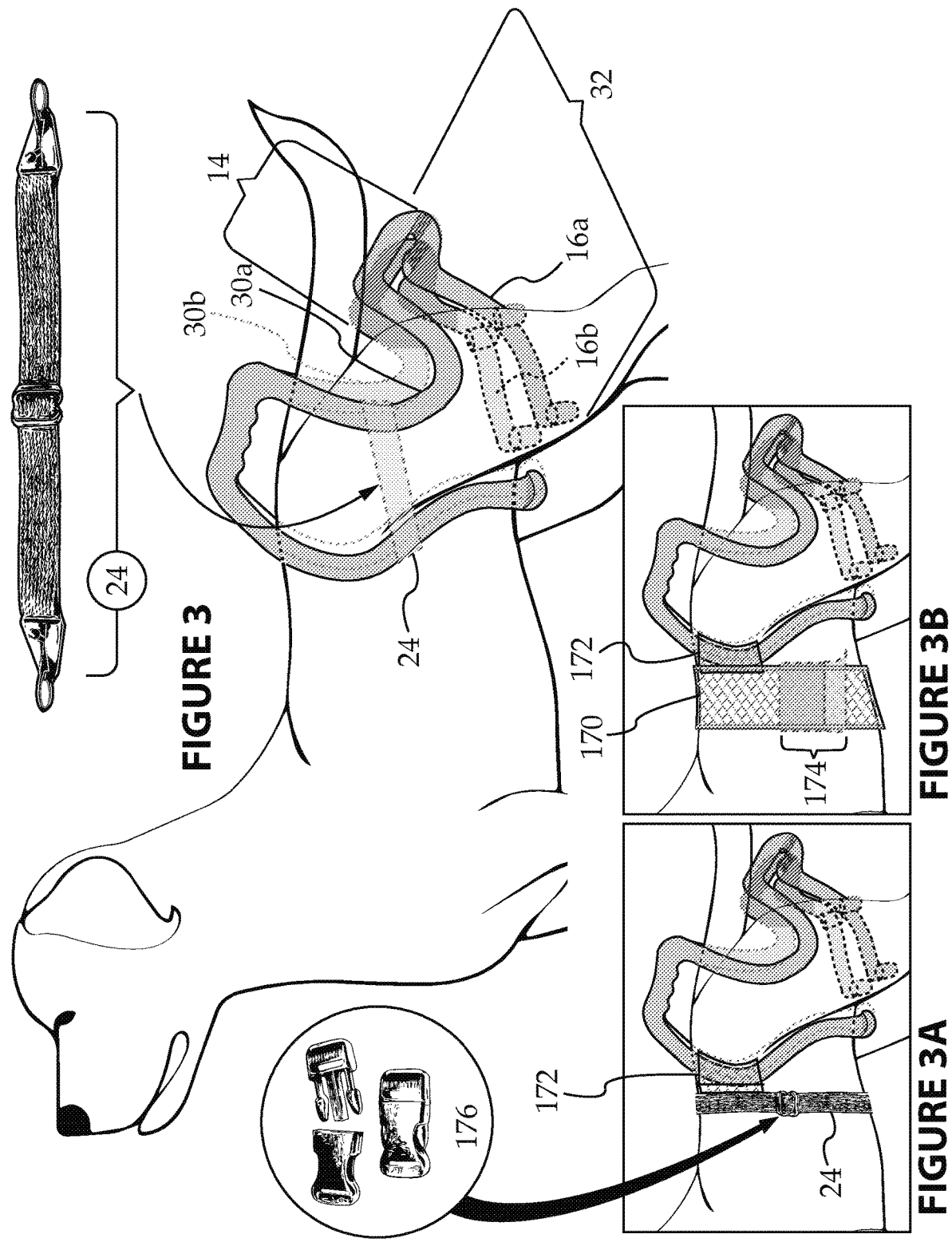
FIG. 3 is a flat front view of the handle potty grip invention as attachably and detachably placed upon a pet and showing receptacle support fingers having higher back angle.

Note, further, adjustable tether 24, aka, strap 24, aka, band 24 in FIG. 2 and FIG. 3, that may comprised of stretch material and additionally attach or connect to the said Potty Grip 2, upon said front arms 4a, 4b, aka at least one gripping appendage 4a, 4a, to more securely, adjustably and flexibly attach said potty grip 2. Additionally, it is to be noted that any and all of the said tethers herein, in any position that might be imagined upon said pet 1 can also be made of a stiffer polymer themselves that has the same "sliding adjustable" features that the actual said Potty Grip 2 components: said arms, fingers, handle, etc., are described as preferably having such flexible, semi-rigid polymer, however, herein.

Thus, the tethers—do NOT necessarily need to be woven or cloth type material—but can be even wire as metal or polymer metal, or flat polymer (noting these said shapes and forms a silicone soft, but semi-rigid material or even a lower cost polypropylene polymer can be of a similar semi-rigid and flexible alternative), all materials in any of the components, including the said handle 8, aka handle grip, aka, handle portion 8, can, itself, have a portion or fully be either stiff or woven (for example the said tethers 24 can have a similar shape of said handle portion 8 with said clearance 10—in that the handle does NOT necessarily need to be a stiff material or semi-rigid material to function and carry all the objectives of the said invention 2), and thus can function as a tether material, substituting for those said apparatus 2 above discussed other shapes and materials that are presently shown as preferably wire or polymer, or a combination of both.

Moreover, note said support arm 14 being curved upwardly more comfortably toward said exit 17 (which shows said receptacle support portion 32 being optionally curved, and also is reversing to go underneath the said pet 1 in FIG. 3, with the optional objective of providing not only a more compact and unobtrusive device, but a more accurate accommodation and "catch" for pet fecal matter.

In FIG. 3A and FIG. 3B, note additional novel options to further secure or connect said grip arms 4 upon or into a receiving sleeve 172, aka, loop 172,—which said loop may be attached to a said tether 24 in FIG. 3A and, alternatively, attached to a stretch band 170 (that is preferably wider and preferably more stretching type), aka, mesh band 170, aka body strap 170 in FIG. 3B. Note these above said loops, mesh and tethers are preferably located at or near or around the said middle-underside 3 of body of said pet 1.

Said adjustable strap 24, aka, strap 24 is adjustable by many optional clasps 176 (clasps, mean all the following could be subsumed into that one descriptor word "clasp", namely: buckles, snaps, connectors, hooks, links et al, well known in belt, band and buckle art, including popular quick-disconnect clasp 176 shown (with or without adjustment feature) or Velcro 174. Again, it is to be firmly noted that all the said tethers 24 can be of a solid polymer or other stiff material that, themselves, too, can utilize the same general category of a variety of said "clasps 176, as mentioned above, only which some of which are illustrated in the drawings.

Figure 4:
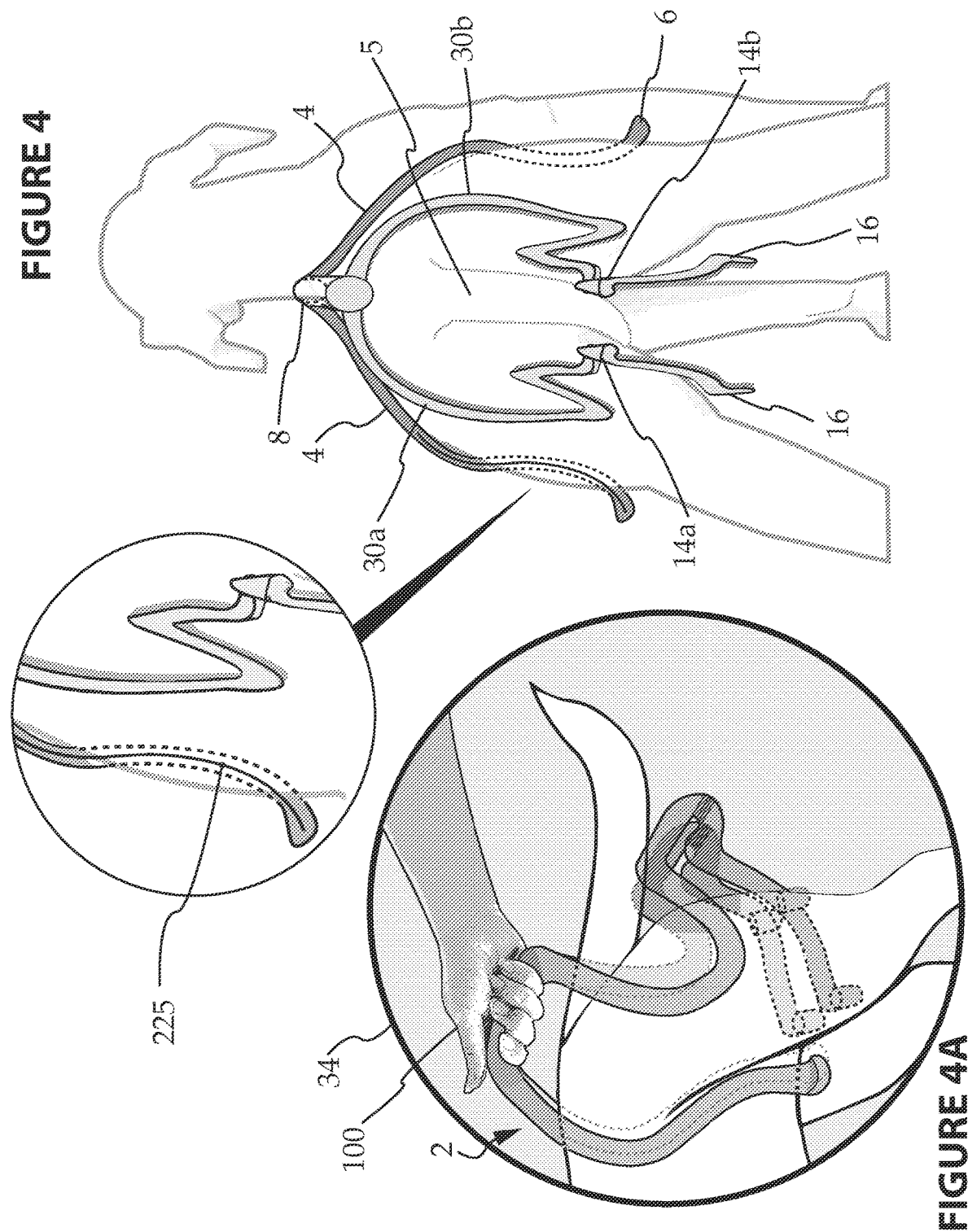
FIG. 4 is a back-end, aka., hinder part perspective view of the handle potty grip invention as viewed on a upon a pet dog showing the back features of the said Potty Grip™ apparatus.

Next, noting FIG. 4, which simply shows a back view of both the said potty handle 2 upon the animal 1, and noting said spring fingers 16a, 16b in unsprung (since no said waste bag 104 or said receptacle attached), which illustrate, noting flex position 225, aka, further having a pet body gripping shape 225 of said arm 4, softly, but firmly snugging the said hinder part 11. An ergonomic and unobtrusive "fit", is obtained such that the said animal is not inconvenienced with the above described and illustrated natural suitability feature of the said potty grip 2.

Figure 5:
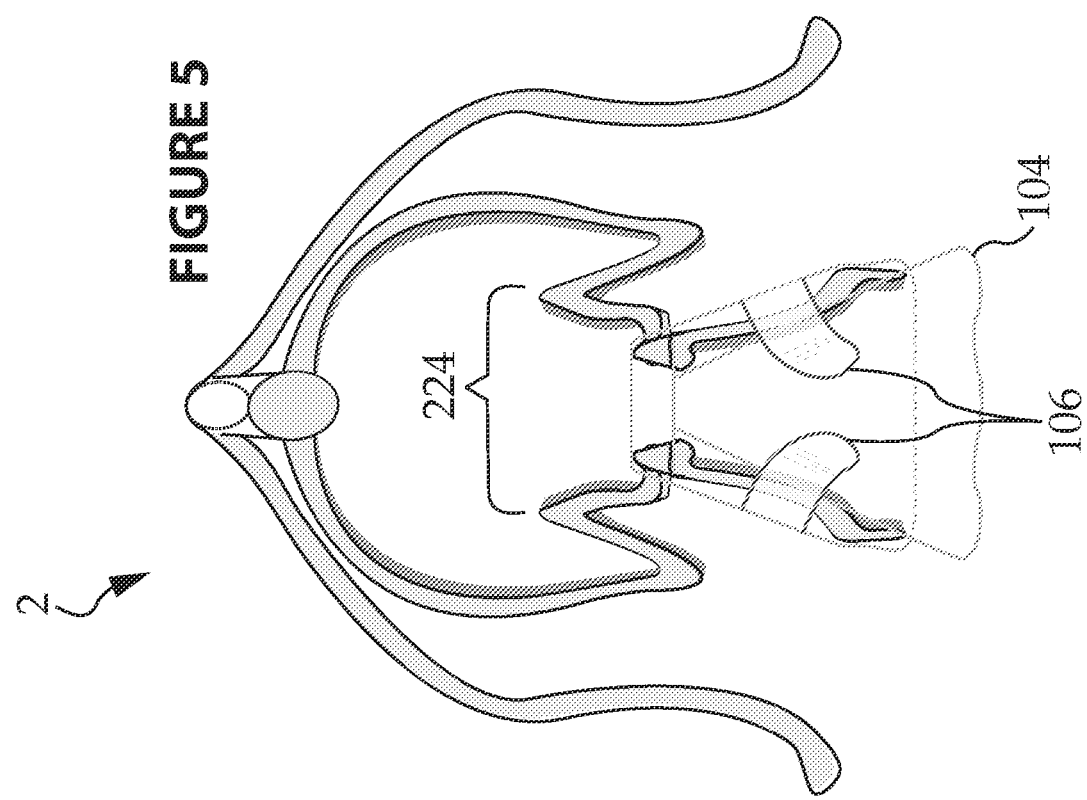
FIG. 5 is a back, aka., hinder part perspective view of the handle potty grip invention viewed as a standalone device, showing the back features of the said Potty Grip™ apparatus.
Figure 5A:
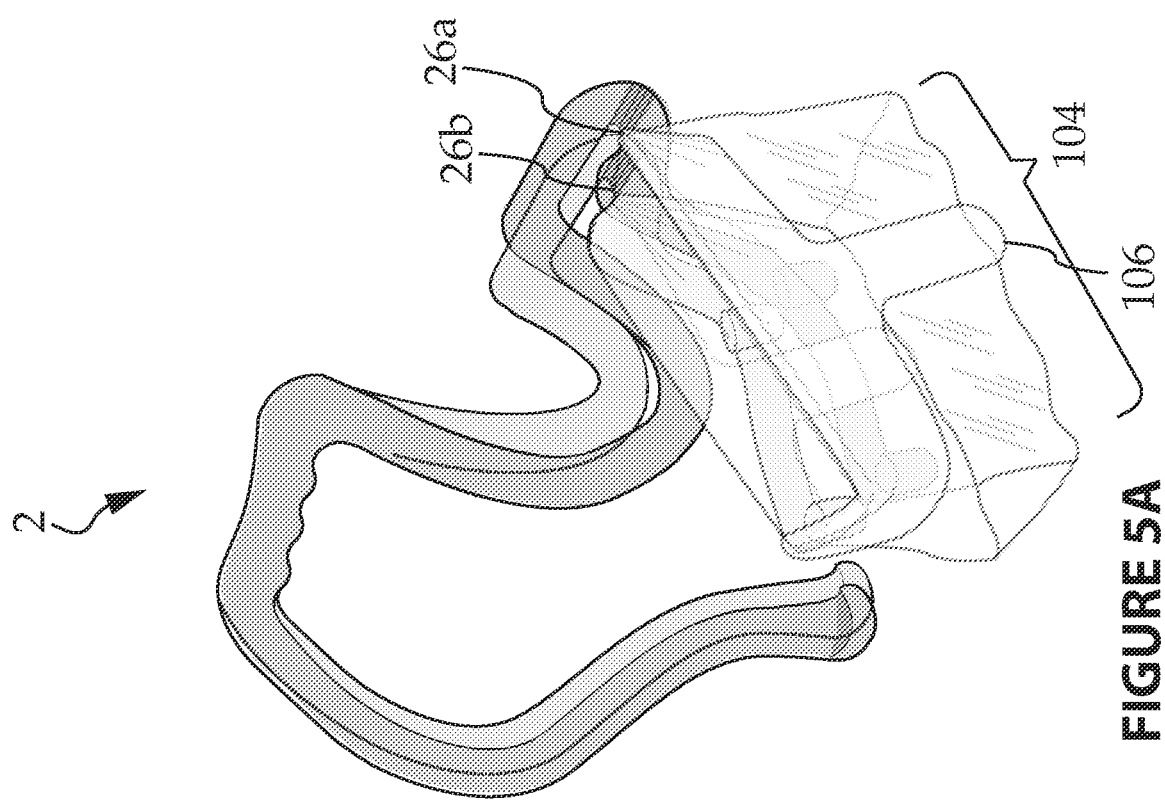
FIG. 5A is a side perspective view of the handle potty grip invention viewed as a standalone device, showing the back features of the said Potty Grip™ apparatus.

Moreover, cutaway bubble 34 illustrates how easily, conveniently, and rapidly the said potty grip 2 can be attached or detached by a human's hand 100 in FIG. 4A. In FIG. 5 note, among other features and components already discussed, adjustable distance 224, which represents an unsprung distance (that can be squeezed (noting squeezing hand 102 in FIG. 6, with said "outward/inward" spring position 108) in to smaller distance that can accommodate said waste bag 104 in FIG. 5A), and fixed into place with a bendable polymer (as discussed for the said arms 16a, 16b) if the said fingers—with said bag 104 thereupon as shown, again, noting how simple application and stretch-tight said waste bag 104 can be fixed in place—in essence "morphing into the structure of the of said potty grip, itself"—among many highly other innovative features of the invention), and also may comprise either a said wire 226 inside themselves OR, might be comprised of a wire only, themselves.

Simply, then, said support fingers 16 are further constructed of spring-tensiled material and biased in a direction apart from one another; said first and second said support fingers 16a, 16b further being squeezable to a narrower position when loading and securing said fecal bag 104 and further being releasable, which simply but effectively affixes and positions said bag in an open position whereby the size of the bag (particularly width) determines how wide the bag opening at the top is opened up, thus allowing for even more "adjustability" for larger or smaller dogs and preventing chaffing of the said pets 1 underside because of an overly wide bag supporting fingers' position.

FIG. 8, simply illustrates how easily a stretch mesh tether 130, aka stretch tether 130 or other similar stretchable material can replace said strap 24a, 24b aka, there 24a, 24b in any of the positions and placements shown can be made, so that instead of a woven or typical fiber tether or mesh material the material that is presently shown as tethers or belts can be made of a harder, stiffer polymer, similar to the polymer or metal wire said gripping appendages, handle, or said flexible fingers 16a, 16b that the general and major portion of the said apparatus 2 is made of.

Note: Contrariwise, it is obvious that in illustration box 180, it is obvious said handle grip 8 portion may optionally be of a flexible—even "collapsible" material, even woven or other highly flexible materials (as shown therein), and as similar to the said tethers, (or the said handle 8 as being—itself—even a portion of said tethers or the handle can be the tether itself or any tether-type material that is extending out therefrom and easily graspable by a said potty grip 2 user on their said pet 1) described and illustrated herein. It is obvious then that the entire said Potty Grip apparatus could be made a of a similar collapsible or woven or tethered-type material, as described in said box 180.

Moreover, in FIG. 8 the said apparatus 2 may comprise the said stretch tether 130 illustrated as simply joining said at least one pet body gripping appendage 4a, 4b and also joining at least one said back-end portion 12a, 12b.

Further, in FIG. 9, we see representative modifications of the said handle grip 8, aka, handle portion 8 having an optional neck portion 144, as well as the said handle grip 8 being easily comprised of various shapes such as handle knob 140, and in Figure note how the said upper portion molded, or fixed said handle 8, aka, said handle portion 146 can optionally define what comfort angle would be best for the said potty grip 2, aka, the invention 2. Moreover, in FIG. 10, while said handle grip 8 is typically shown through the illustrations to be positioned parallel to the axis of the said animal 1, various "non-parallel angles" 150 are shown in a modified said handle grip 8 in FIG. 10 shown to be perpendicular to the lengthwise axis of the said pet 1. Also shown in FIG. 10 an optional underbody strap 154, where also is shown take up slack area 152, through pull tether 156.

A pet collar portion 160, aka, a chest harness 160 (which in most perceived uses on the said invention 2, aka waste management apparatus 2, will be a pet collar 164, aka, pet collar portion 164—that may also be a said chest harness 160 type collar) is shown in FIG. 11 wherein is illustrated a sliding button strap clasp 158 that may be either slidable only, or slide-locking, enabling it to be positioned upon said dog collar, as well, it may optionally comprise a sewn loop 162 on the end of said strap 24 that can attach nearly anywhere on the said waste management apparatus 2. These tethers 24 are not necessarily needed but would serve to stabilized and keep the said apparatus 2 fixed to the said pet 1, particularly those pets that are lively and rambunctious, and such tethers, as shown are quite easy to attach, clasp and unclasp.

Figure 12:
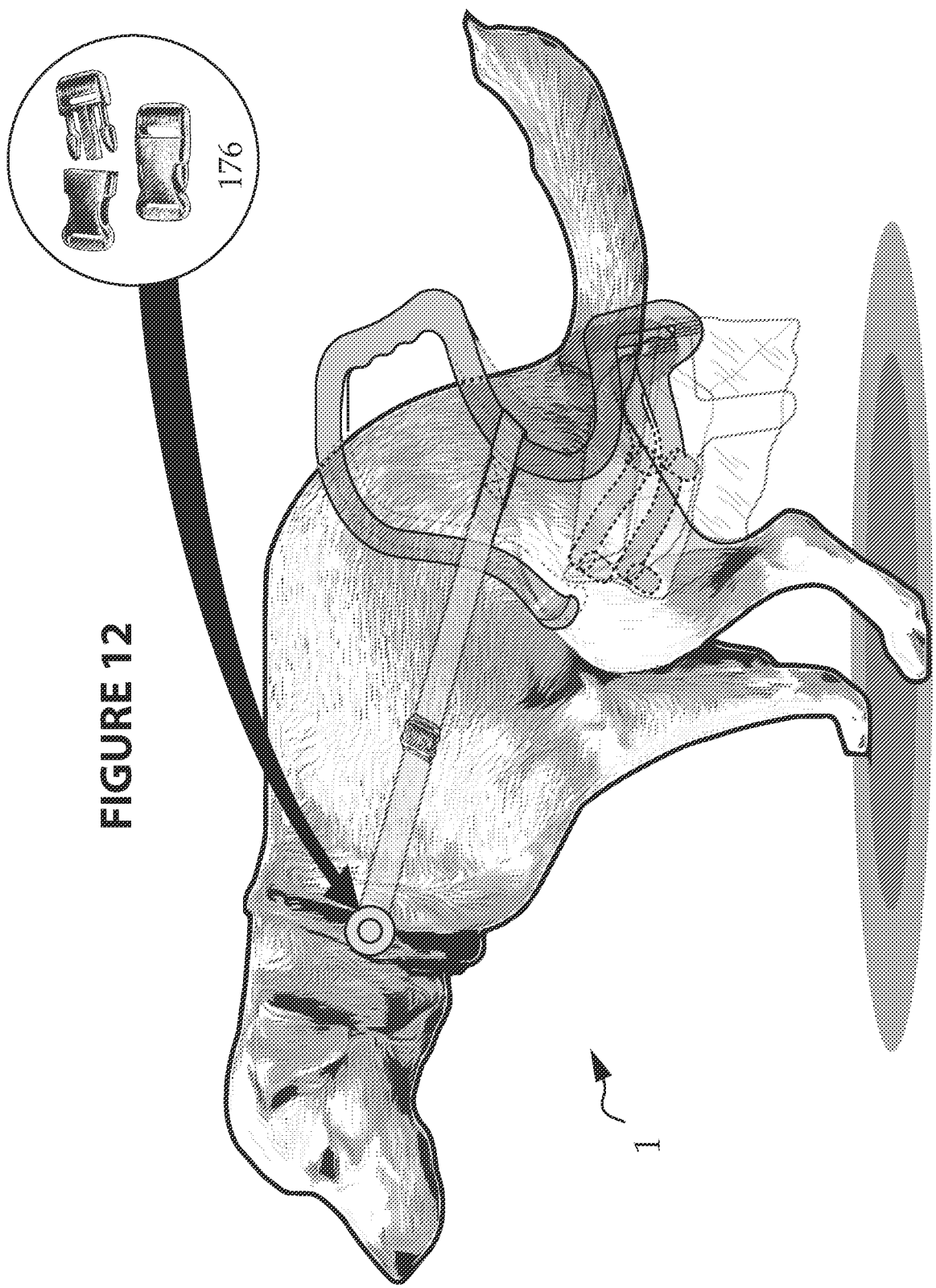
FIG. 12 is a flat front view of the handle potty grip invention upon a pet and showing optional adjustable strap material connected to a standard pet collar and showing the natural flexibility and gentle adaptation of the invention to a dog that is in a "waste movement" squat.

In FIG. 12, note said pet 1 in a fecal relief position, while noting the novel, non-obtrusive, comfortable, minimalistic, lightweight, highly effective said Potty Grip 2, aka the invention 2 in all its adaptability, adjustability and utility, providing a much needed and sustainable solution for effectively managing pet waste.

Moreover, finally, it is then it may be clearly understood now noted that these following steps in a method or process may be taken by a user to effectuate the above invention may be summarized as follows:

A method of using said waste management apparatus 2 for said pet 1 would comprise the steps of:
 a. attaching a fecal receiving waste bag 104 upon at least one support arm 14 that extends from a pet-attachable/detachable handle grip 8;
 b. placing upon the body of said pet 1 said attachable/detachable handle grip 8 whereby at least one pet body gripping appendage 4 extending therefrom is supported by the body of said pet 1;
 c. awaiting said pet 1 wearing said pet-attachable/detachable handle 8 to relieve its bowels into the said fecal waste bag 104;
 d. detaching said handle grip 8 from said pet 1 once said pet 1 has relieved itself of fecal matter into said fecal waste bag 104;
 e. removing said fecal waste bag 104 from said at least one support arm 14;
 f. disposing of said fecal waste bag 104 with fecal waste therein.

It is to be noted that between steps of step a and step b an additional step of adjusting said gripping appendage extending therefrom to better from fit said pet may be an effective optional added method step of carrying out said innovation 2, in the event the pet owner is using an adjustable version of the said pet waste management device 2, as illustrated in the specification and drawings.

Alternate modifications to the structure, system, method or process, once the applicant has thoroughly taught the system and structure in the above application and drawings, it then should be obvious to one skilled in the art to readily find logical alternatives as to conceiving various similar handled apparatuses of other variations and modifications of the present invention. It is now and will be apparent to those of ordinary skill in the art, and it is the intent of the appended claims that the scope and spirit of such variations and modifications be covered.

The components, configurations and assemblies discussed above can be varied, and are cited to illustrate representative embodiments of the present invention and are not intended to limit the scope of the invention. Other equivalent elements, methods and steps can be substituted for those described and illustrated herein; parts, steps and elements may be reversed, expanded, modified and certain features of the invention may be used independently of the use of other features, all without departing from the spirit and scope of the invention, as defined in the subjoining claims.

The intent of the following Claims are to be interpreted and construed such that the Independent Claims would be broad enough to cover any potty handle invention besides that described and illustrated throughout the embodiments disclosed herein and any logical derivatives thereof, such that the independent claims would cover a wide scope beyond any of the basic embodiments or versions, as clearly and exhaustively proven to be of one single, unified, invention species, of which the applicant humbly requests Letters Patent upon, respectfully said.

The invention claimed is:

1. A waste management apparatus for a pet, attachable/detachable upon a pet body comprising:
 A handle;
 said handle further comprising at least one pet body gripping appendage extending therefrom; said at least one pet body gripping appendage further having a pet body gripping shape;
 said handle further comprising at least one back-end portion extending therefrom; said at least one back-end portion further comprising at least one support arm extending therefrom;
 said at least one support arm further supporting a fecal receiving container thereon.

2. The apparatus as recited in claim #1 wherein the said at least one pet body gripping appendage extending therefrom further comprises two gripping appendages, one said gripping appendage extending per each side of said pet body;
 and wherein the said at least one back-end portion extending therefrom further comprises two back-end portions extending therefrom, one said back-end portion extending per each side of said pet body
 and wherein said handle further comprises a handle grip clearance portion.

3. The apparatus as recited in claim #1 wherein the said at least one support arm further comprises a receptacle rim portion that detachably/attachably supports said fecal receiving container thereon, Said fecal receiving container further comprising a molded cup-like removable container.

4. The apparatus as recited in claim #3 wherein the said cup-like removable container further comprises a hinge lid formed as a cover said cup-like removable container.

5. The apparatus as recited in claim #1 wherein the said at least one support arm further comprises a receptacle rim portion that detachably/attachably supports said fecal receiving container thereon; and wherein the said fecal receiving container further comprises an attachable/detachable fecal waste bag supported thereon.

6. The apparatus as recited in claim #1 wherein the said at least one support arm further comprises first and second support fingers that detachably/attachably support said fecal receiving container thereon; said fecal receiving container further comprising an attachable/detachable fecal waste bag supported thereon.

7. The apparatus as recited in claim #6 wherein the said at least one support arm further comprises two support arms whereat one of said two support arm comprises the first said support finger and the other said support arm comprises the second said support finger.

8. The apparatus as recited in claim #7 wherein the first and second said support fingers are further constructed of spring-tensiled material and biased in a direction apart from one another; first and second said support fingers further being squeezable to a narrower position when loading and securing said fecal bag and further being releasable and spring-opening after said fecal bag is loaded onto same; and wherein further the said support fingers have receiving slots whereinto a lip portion of said attachable/detachable fecal waste bag is affixed.

9. The apparatus as recited in claim #1 wherein said waste management apparatus is further comprised of a spring tensiled material and wherein said attachable/detachable handle is manufactured as one single molded polymer component; said pet body gripping appendage further comprising two said gripping appendages; said two gripping appendages being further both extending and bifurcating from said handle.

10. The apparatus as recited in claim #1 wherein said waste management apparatus is adjustable and further comprises sliding-adjustable frame members that adjustably fit a pet body.

11. The apparatus as recited in claim #1 wherein said waste management apparatus further comprises a bend-to-shape contouring frame material.

12. The apparatus as recited in claim #1 wherein said apparatus comprises a tether; said tether having at least a first tether end; said first tether end being attachable/detachable to a portion of said waste management apparatus at said first tether end.

13. The apparatus as recited in claim #12 wherein said first tether further having a second tether end; said second tether end being attachable/detachable to a dog collar portion located on at least a second end of said first tether.

14. The apparatus as recited in claim #1 wherein said apparatus comprises a detachable band located near the said middle-underside of said pet; said at least one gripping appendage being connected to said detachable band.

15. The apparatus as recited in claim #14 wherein said detachable band further comprises a stretchable mesh and wherein said detachable band further comprises a receiving sleeve whereinto said at least one gripping appendage being connected thereto.

16. The apparatus as recited in claim #1 wherein said handle, itself, further comprises a tether portion.

17. The apparatus as recited in claim #1 wherein said apparatus comprises at least one stretch tether joining said at least one pet body gripping appendage and further joining at least one said back-end portion.

18. A waste management method for a pet comprising the steps of:
   a. attaching a fecal receiving waste bag upon at least one support arm that extends from a pet-attachable/detachable handle;
   b. placing upon the body of a pet said attachable/detachable handle whereby at least one pet body gripping appendage extending therefrom is supported by the body of said pet;
   c. awaiting said pet wearing said pet-attachable/detachable handle to relieve its bowels into the said fecal waste bag;
   d. detaching said handle from said pet once said pet has relieved itself of fecal matter into said fecal waste bag;
   e. removing said fecal waste bag from said at least one support arm;
   f. disposing of said bag with fecal waste therein.

19. The waste management method for a pet in claim #18 wherein between the steps of a and step b an additional step of adjusting said gripping appendage extending therefrom to better from fit said pet is included.

20. A waste management apparatus for a pet, attachable/detachable upon a pet body comprising:
   A handle;
   said handle further comprising at least one pet body gripping appendage extending therefrom; said at least one pet body gripping appendage further having a pet body gripping shape;
   said handle further comprising at least one back-end portion extending therefrom; said at least one back-end portion further comprising at least one support arm extending therefrom;
   said at least one support arm further supporting a fecal receiving container thereon;
   and wherein the said at least one support arm further comprises first and second support fingers that detachably/attachably support said fecal receiving container thereon; said fecal receiving container further comprising an attachable/detachable fecal waste bag supported thereon;
   and wherein the said at least one support arm further comprises two support arms whereat one of said two support arm comprises the first said support finger and the other said support arm comprises the second said support finger;
   and wherein the first and second said support fingers are further constructed of spring-tensiled material and biased in a direction apart from one another; first and second said support fingers further being squeezable to a narrower position when loading and securing said fecal bag and further being releasable and spring-opening after said fecal bag is loaded onto same; and wherein further the said support fingers have receiving slots whereinto a lip portion of said attachable/detachable fecal waste bag is affixed;
   and wherein said apparatus comprises a tether; said tether having at least a first tether end; said first tether end being attachable/detachable to a portion of said waste management apparatus at said first tether end; and wherein said first tether further having a second tether end; said second tether end being attachable/detachable to a dog collar portion located on at least a second end of said first tether by means of a clasp.

* * * * *